United States Patent

[11] 3,602,203

[72] Inventor Robert C. Mowry
3672 Princeton Ave., San Diego, Calif. 92117
[21] Appl. No. 6,850
[22] Filed Jan. 29, 1970
[45] Patented Aug. 31, 1971

[54] TOROIDAL TWO-CYCLE ENGINE
9 Claims, 7 Drawing Figs.
[52] U.S. Cl. .................................................. 123/18, 123/8.47
[51] Int. Cl. ............................................... F02b 53/06
[50] Field of Search ........................................ 123/18, 8.47, 18 A; 91/223, 339, 340

[56] References Cited
UNITED STATES PATENTS
| | | | |
|---|---|---|---|
| 1,283,375 | 10/1918 | ViK | 123/18 |
| 2,154,315 | 4/1939 | Moraway | 123/18 A |
| 1,094,794 | 4/1914 | Kemper | 123/18 A |
| 2,156,180 | 4/1939 | Horner | 123/8.47 |
| 2,968,290 | 1/1961 | Bradshaw | 123/18 |

Primary Examiner—Clarence R. Gordon
Attorney—Carl R. Brown

ABSTRACT: A toroidal two-cycle engine in which two opposed pairs of pistons oscillate in opposition in four toroidal cylinders, dual power strokes occuring at each reversal of piston motion. An intake manifold connecting all cylinders is charged with combustible mixture through a uniflow scavenging system, utilizing the motion of the pistons in both directions. The engine is of simple construction and the inertia of the moving parts is equal and opposite about a common axis, so that vibration and stress are minimized. Functional parts of the engine are readily accessible and the structure is easily dismantled for servicing.

PATENTED AUG 31 1971

INVENTOR.
ROBERT C. MOWRY

BY Carl R. Brown

ATTORNEY

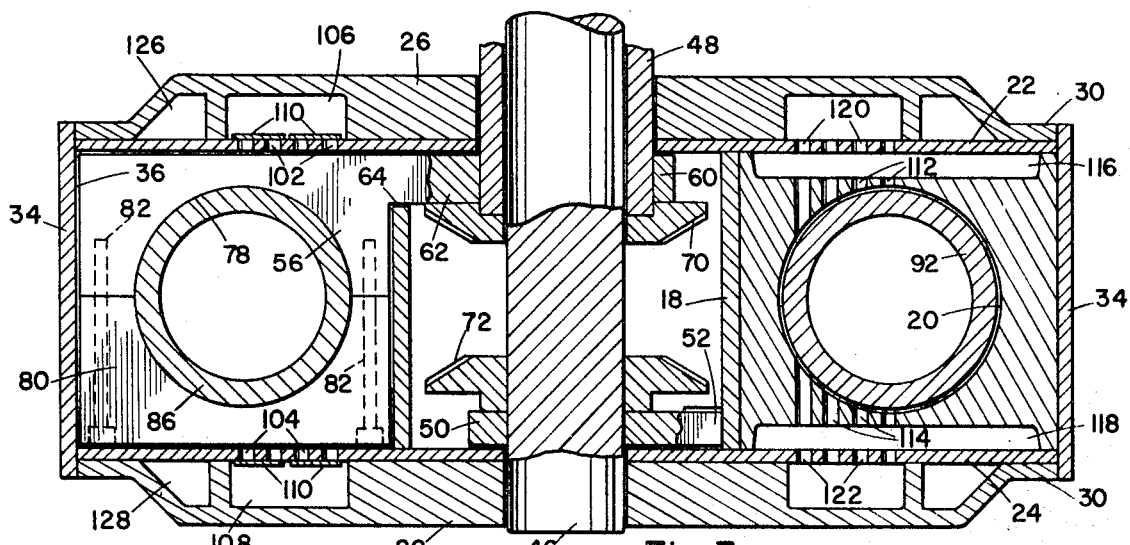
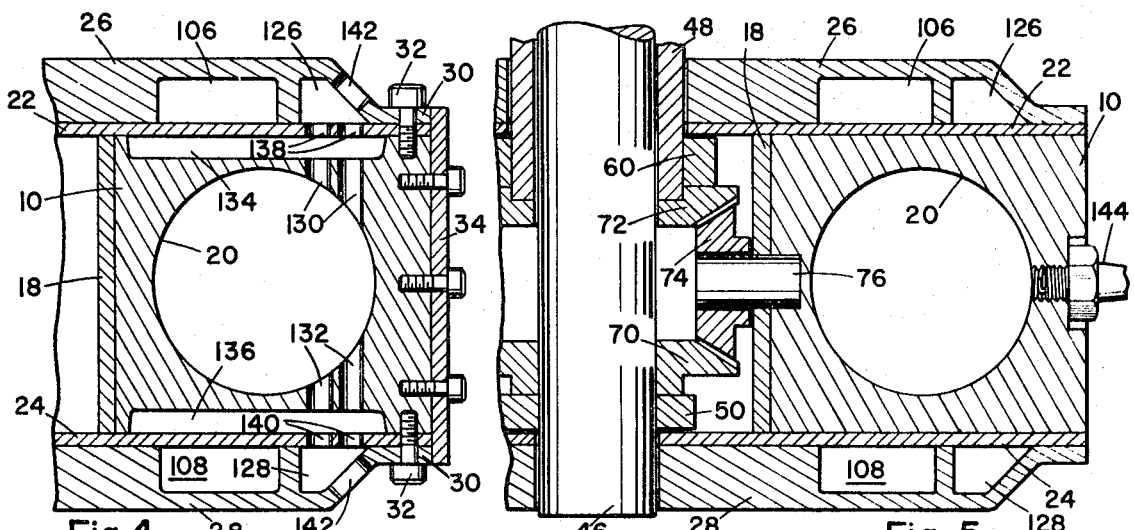
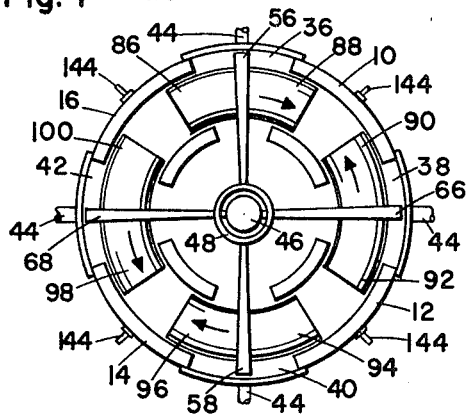
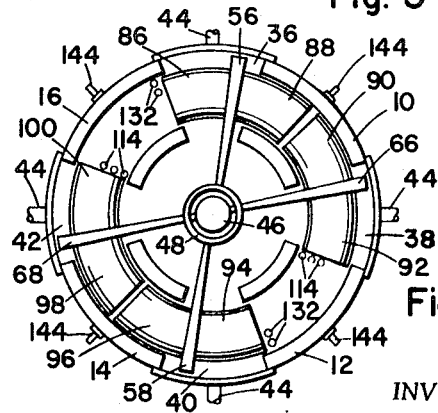
Fig. 3
Fig. 4
Fig. 5
Fig. 6
Fig. 7
INVENTOR.
ROBERT C. MOWRY
BY Carl R. Brown
ATTORNEY

3,602,203

TOROIDAL TWO-CYCLE ENGINE

BACKGROUND OF THE INVENTION

Various types of toroidal engines with oscillating pistons have been developed with complex coupling and drive mechanisms, usually external, which make the engines bulky and intricate. Fuel and exhaust flow is usually controlled by synchronized valve means, again requiring complex operating mechanism.

SUMMARY OF THE INVENTION

The engine described herein has two opposed pairs of pistons oscillating about a common axis in four toroidal cylinders, synchronization being maintained by coupling means completely contained within the engine. Dual power strokes occur at each limit of piston motion, the inertia of the moving parts being equal and opposite, so that vibration and stress are minimized. Motion of the pistons in both directions through scavenging chambers between the cylinders, charges an intake manifold with combustible mixture through simple nonreturn valves, with a uniflow type action. No mechanically coupled or synchronized valves are necessary in the engine. Common intake and exhaust manifolds are incorporated in end housings, which also provide bearings for dual output shafts. The only moving parts are the pistons and their coupling means, the engine structure being very simple.

An object of this invention, therefore, is to provide a new and improved toroidal two-cycle engine having internally coupled oscillating pistons which have power strokes at each limit of piston motion, in opposed and balanced relation.

Another object of this invention is to provide a toroidal two-cycle engine having a uniflow scavenging and intake charging action, without the need for mechanically driven or timed valves.

A further object of this invention is to provide a toroidal two-cycle engine of simple construction with very few moving parts, and which is easily serviced.

Other objects and many advantages of this invention will become more apparent upon a reading of the following detailed description and an examination of the drawings, wherein like reference numerals designate like parts throughout and in which:

BRIEF DESCRIPTION OF THE DRAWINGS

FIG. 3 is a sectional view taken on line 3—3 of FIG. 1.
FIG. 4 is a sectional view taken on line 4—4 of FIG. 1.
FIG. 5 is a sectional view taken on line 5—5 of FIG. 1.
FIG. 6 is a diagrammatic view of the engine with the pistons in mid stroke.
FIG. 7 is a diagrammatic view with the pistons at the other limit of motion.

DESCRIPTION OF THE PREFERRED EMBODIMENT

Figure 1:
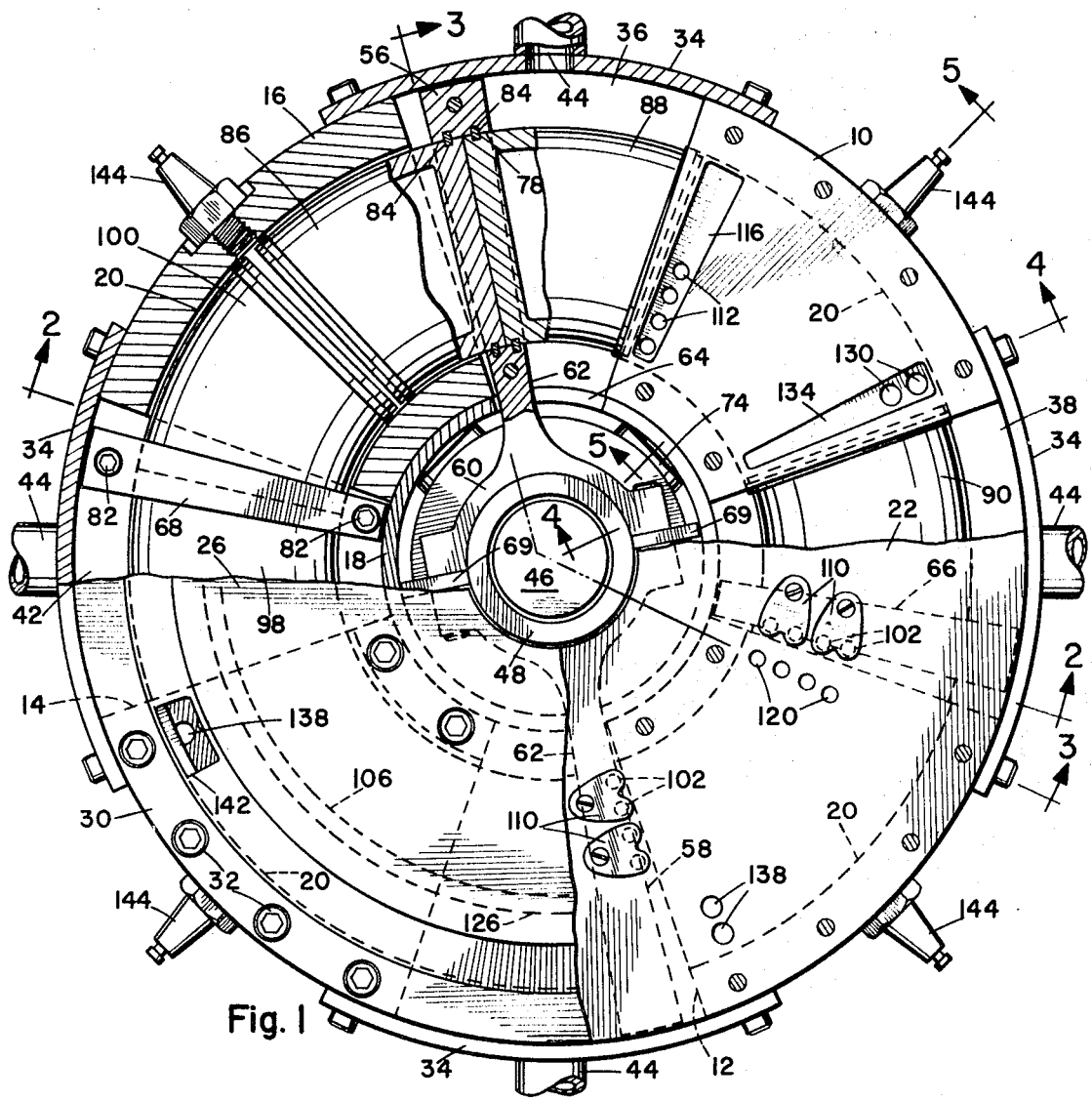
FIG. 1 is an end elevation view of the engine, with portions cut away, the pistons being at one limit of motion.
Figure 2:
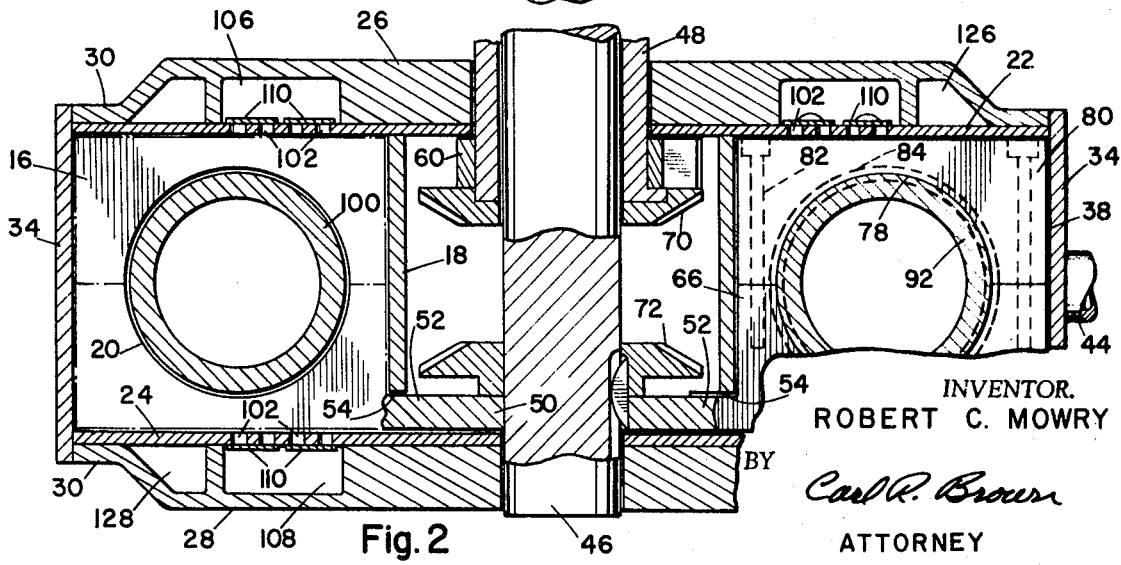
FIG. 2 is a sectional view taken on line 2—2 of FIG. 1.

The engine is generally a flat cylindrical cylinder unit having four cylinder blocks 10, 12, 14 and 16 equally spaced around a central sleeve 18. Each cylinder block is a sector of a ring element of rectangular cross section and has a toroidal cylinder bore 20, the four bores being in common toroidal alignment. On opposite ends of the cylinder block assembly are flat circular separator plates 22 and 24 and fixed over the separator plates are end covers 26 and 28, respectively. Each end cover has a peripheral flange 30, and the assembly is secured by cap screws 32, or the like, through the flanges and separator plates, into the cylinder blocks. The peripheral gaps between the cylinder blocks are closed by cover plates 34, enclosing scavenging chambers 36, 38, 40 and 42. Each cover plate 34 has an inlet 44 opening substantially into the center of the respective scavenging chamber.

A shaft 46 extends axially through the unit and is journaled at one end in end cover 28, the other end having a bearing in a concentric tubular shaft 48, which in turn is journaled in end cover 26. Fixed to shaft 46 is a hub 50 having a pair of diametrically opposed arms 52 which extend through slots 54 in sleeve 18. One arm 52 carries a scavenging vane 56 which is a close sliding fit in chamber 36, the other arm carrying a similar scavenging vane 58 which slides in chamber 40. Fixed on shaft 48 is a hub 60 with a pair of diametrically opposed arms 62 extending through slots 64 in sleeve 18, at the opposite end from slot 54. One arm 62 carries a scavenging vane 66 which slides in chamber 38 and the other arm carries a scavenging vane 68 which slides in chamber 42. For ease of assembly, the hubs 50 and 60 are preferably split diametrically and secured by screws or other retaining means. To reduce blowby between opposed chambers, wiper vanes 69 are held between the split hub portions, as in FIG. 1, and swing with a close fit inside sleeve 18.

In operation the pairs of scavenging vanes swing in short arcs in opposite directions and must be synchronized by a suitable linkage such as gears, a yoke or a hydraulic coupling. The simple arrangement shown comprises a bevel gear 70 fixed on shaft 46, an opposed bevel gear 72 fixed on shaft 48 and one or more pinion gears 74 interconnecting the bevel gears. In FIG. 5, a pinion gear 74 is shown mounted on a stub shaft 76 secured in the cylinder block 10, but any suitable bearing may be used. Plain bearings in the end covers are also indicated for the shafts 46 and 48, but it will be obvious that conventional ball or roller bearings could be incorporated.

For ease of manufacture and assembly, the pistons are each made in two parts, each scavenging vane carrying a pair of pistons on opposite sides. Each scavenging vane has a bore 78 and is split diametrically of the bore to provide a clamp portion 80, which is secured by cap screws 82 or the like. Two pistons are fitted into each bore with their ends abutting and are secured by retaining rings 84 inset into the pistons and the bore, as in FIG. 1. Scavenging vane 56 thus carries a piston 86 riding in the toroidal bore of cylinder block 16, and an opposed piston 88 riding in cylinder block 10. Scavenging vane 66 carries a piston 90 riding in cylinder block 10 and an opposing piston 92 riding in cylinder block 12. Scavenging vane 58 carries pistons 94 and 96 riding in cylinder blocks 12 and 14, respectively, and scavenging vane 68 carries pistons 98 and 100, which ride in cylinder blocks 14 and 16, respectively.

At opposite ends of each scavenging chamber the separator plats 22 and 24 have transfer ports 102 and 104 opening into annular intake manifold passages 106 and 108, respectively, in the end covers 26 and 28. The transfer ports are normally closed by reed valves 110, which open into the manifold passages but prevent return flow. Other types of one-way valves may be equally suitable. At one end of each cylinder bore 20 are inlet ports 112 and 114 passing through the respective cylinder block into radial slots 116 and 118. In the separator plates 22 and 24 are inlet ports 120 and 122 aligned with slots 116 and 118, respectively, and opening into intake manifolds 106 and 108.

The end covers 26 and 28 have exhaust manifold passages 126 and 128, respectively, outside and concentric with the intake manifold passages 106 and 108. At the other end of each cylinder bore 20 are exhaust ports 130 and 132 passing through the respective cylinder block into radial slots 134 and 136. Separator plates 22 and 24 have exhaust ports 138 and 140, aligned with slots 134 and 136 and opening into exhaust manifolds 126 and 128, respectively. End covers 26 and 28 have exhaust outlets 142 suitably located around the exhaust manifolds, and an external manifold, not shown, may be used to connect the exhaust outlets and conduct and muffle the exhaust if necessary.

Each cylinder block is provided with a spark plug 144, or other ignition means, inset in the outer wall at the center of each cylinder bore 20. Conventional ignition circuitry may be used and timed in any well-known manner by coupling to either of shafts 46 and 48, or to some other moving part with appropriately timed action.

In the form shown the two shafts 46 and 48 have an opposed rotary oscillating motion. For some purposes, such as pumping this driving action may be used directly, but mechanisms for converting oscillatory to continuous rotary motion are well known. The engine is started by any suitable means coupled to one or both of the shafts. A combustible mixture is supplied to all inlets 44 from a conventional source, such as a carburetor. As the scavenging vanes oscillate from end to end of their respective chambers, combustible mixture in the chambers is driven through transfer ports 102 and 104 into the intake manifolds 106 and 108. Reed valves 110 prevent backflow, so the intake manifolds are kept charged with combustible mixture under pressure.

Starting from the position shown in FIG. 1, combustible mixture from the intake manifolds enters cylinder blocks 10 and 14 through the exposed inlet ports. As the pistons 88 and 90 come together in cylinder block 10, and pistons 96 and 98 come together in cylinder block 14, the mixture between the approaching pistons is compressed. The intermediate position of the pistons is shown in FIG 6, with the motion indicated by directional arrows on the approaching pairs of pistons. At the peak of compression, as in FIG. 7, the spark plugs fire and the resultant explosion drives the pistons apart. When the cylinder ports become exposed, the incoming charge of mixture through the inlet ports drives the combustion products out through the exhaust ports into exhaust manifolds 126 and 128. The explosion also drives pistons 92 and 94 together in cylinder block 12, and pistons 86 and 100 together in cylinder block 16, to repeat the action in those two cylinders. Thus dual, equal and opposite power strokes occur alternately in opposed pairs of cylinders. The scavenging vanes maintain a constant supply of combustible mixture to the intake manifolds, and the only valves needed are the reed valves 110, or their equivalents, which do not require any timing mechanism. With the intake and exhaust ports at opposite ends of each cylinder, efficient uniflow scavenging and recharging occurs at the maximum separation of the pistons.

The moving parts are balanced about the axis of rotation and the inertia is equal and opposite, resulting in a very smooth-running engine. By proper weight distribution in the moving parts, the engine may be designed to have a particular stable oscillation frequency and run at a constant speed for a specific purpose, such as for driving an AC generator or alternator. With few moving parts and no elaborate timing or synchronizing mechanism, the structure is simple and easy to service. The engine will operate on a variety of fuels, with electrical ignition means or using compression ignition, or a fuel injection system may be used with conventional injectors in place of the spark plugs and air supplied to the intakes, thereby allowing an increase in operating speed.

Having described my invention, I now claim.

1. A toroidal two-cycle engine, comprising,
a cylinder unit with circumferentially spaced blocks having toroidal cylinder bores in common toroidal alignment,
said cylinder unit having enclosed scavenging chambers between said cylinder blocks,
a pair of counterrotating shafts coaxially mounted in said cylinder unit,
a pair of opposed scavenging vanes fixed to one of said shafts and sliding in one opposite pair of said scavenging chambers,
a pair of opposed scavenging vanes fixed to the other of said shafts and sliding in the other opposite pair of said scavenging chambers,
pistons secured on and extending from opposite sides of each of said scavenging vanes and sliding in said cylinder bores,
each of said cylinder bores having inlet ports at one end and outlet ports at the other end thereof,
an intake manifold communicating with all of said inlet ports,
each of said scavenging chambers having an inlet for connection to a source of combustible mixture,
transfer ports from each of said scavenging chambers to said intake manifold, with nonreturn valve means therein,
and synchronizing means interconnecting said shafts to rotate equally in opposite directions.

2. An engine according to claim 1, wherein said transfer ports are at opposite ends of each of said scavenging chambers.

3. An engine according to claim 1, wherein said pistons are in pairs secured in end to end abutting relation in said scavenging vanes.

4. An engine according to claim 1, and including ignition means in each of said cylinder bores.

5. An engine according to claim 1, and including a separator plate fixed to at least one of said cylinder unit and enclosing the ends of said scavenging chambers, said transfer ports extending through said separator plate.

6. An engine according to claim 5, wherein said valve means are mounted on said separator plate.

7. An engine according to claim 6, wherein said valve means comprises resilient reed valves secured to said separator plate externally of the scavenging chambers and normally closing said transfer ports.

8. An engine according to claim 5, and including an end cover secured over said separator plate said intake manifold comprising an annular channel in said end cover.

9. An engine according to claim 8, and including an annular exhaust manifold in said end cover, communicating with said exhaust ports.